United States Patent [19]

Boie

[11] Patent Number: 5,572,441
[45] Date of Patent: Nov. 5, 1996

[54] DATA CONNECTOR FOR PORTABLE DEVICES

[75] Inventor: Robert A. Boie, Westfield, N.J.

[73] Assignee: Lucent Technologies Inc., Murray Hill, N.J.

[21] Appl. No.: 222,220

[22] Filed: Apr. 4, 1994

[51] Int. Cl.⁶ .................................................. G06K 15/00
[52] U.S. Cl. ...................... 364/514 R; 307/109
[58] Field of Search .................... 364/514, 468, 364/478, 401; 235/439, 492, 493, 487, 451, 375, 380, 379; 307/109; 375/220; 340/828.34, 825.31, 825.33

[56] References Cited

U.S. PATENT DOCUMENTS

| | | | |
|---|---|---|---|
| 4,277,837 | 7/1981 | Stuckert | 364/900 |
| 4,480,178 | 10/1984 | Miller, II et al. | 235/380 |
| 4,650,981 | 3/1987 | Foletta | 235/449 |
| 4,798,322 | 1/1989 | Bernstein et al. | 235/487 |
| 4,816,654 | 3/1989 | Anderl et al. | 235/380 |
| 5,073,761 | 12/1991 | Waterman et al. | 333/24 |
| 5,175,418 | 12/1992 | Tanaka | 235/439 |
| 5,229,652 | 7/1993 | Hough | 307/104 |
| 5,412,253 | 5/1995 | Hough | 307/17 |
| 5,432,328 | 7/1995 | Yamaguchi | 235/449 |
| 5,434,396 | 7/1995 | Owen et al. | 235/380 |

FOREIGN PATENT DOCUMENTS

| | | |
|---|---|---|
| 260221 | 9/1987 | European Pat. Off. . |
| 3713251 | 4/1987 | Germany . |
| 2137781 | 3/1984 | United Kingdom . |
| 2149548 | 6/1985 | United Kingdom . |

OTHER PUBLICATIONS

Bertolaccini et al., "On the Problem of Optimum Signal-to-Noise Ratio in Amplitude Measurements," *Nucl. Instru. and Meth.*, 41, 173 (1966).

M. Konrad, "Detector Pulse Shaping for High Resolution Spectroscopy," *IEEE Trans. Nuclear Sci.*, NS–15 (No. 1), 268–281 (1968).

Carlson, A. B. *Communication Systems*, McGraw–Hill, NY, 156–158 (1974).

*Primary Examiner*—James P. Trammell
*Attorney, Agent, or Firm*—Ronald D. Slusky; Donald P. Dinella

[57] ABSTRACT

Portable computing and communications devices are connected with other, typically fixed devices via the use of a capacitive data connector. Each of the two mating sections of the connector includes a set of coupling plates. When the two sections are brought into contact, the coupling plates form capacitors across which data signals can be passed. Circuitry driving each section of the data connector is such as to create a bidirectional signaling path, thereby providing a connection which is functionally equivalent to an ohmic connection. Signals that are typically passed across data connectors on individual parallel leads are, in the present data connector, serialized, passed across the connector in that form and connected back to parallel form on the other side of the connection. Each section of the connector illustrately includes a permanent magnet to draw and hold the two sections in alignment, thereby providing a connector which is self-aligning.

13 Claims, 5 Drawing Sheets

DATA CONNECTOR FOR PORTABLE DEVICES

BACKGROUND OF THE INVENTION

The present invention relates to data connectors for use in conjunction with laptop computers and other portable computing/communications devices.

Technology is providing us with an ever-increasing number of types of portable computing and communications devices, including laptop computers, so-called personal digital assistants (PDAs), and portable terminals such as are used by package deliverymen. These devices, while designed to be principally used in a portable, stand-alone, mode often need to be connected to other, fixed systems from time to time. For example, a traveling executive may wish to upload computer files or calendar information created on a laptop computer or PDA into her office personal computer (PC) or into a file server accessed via, for example, a local area network or the dial-up telephone network. Similarly, the package deliveryman may need to effect an exchange of information between his portable terminal and a host computer mounted in his truck.

Applications such as these give rise for the need for data connectors that are reliable, rugged and easy to use. Unfortunately, today's data connectors for such applications are anything but. For example, the physical pins used in the "male" section of the typical data connector, are subject to damage due to contamination, misaligned insertions and physical trauma (e.g., being dropped.) The sockets used in the female section of the connector are also subject to contamination. These problems can be alleviated to some extent via the provision of, for example, small access "doors" which can protect against contamination and the inadvertent insertion of foreign objects, e.g., paper clips, into the sockets. Such access doors, however, are inconvenient to deal with. Moreover, they tend to be rather fragile and to eventually break off.

SUMMARY OF THE INVENTION

In accordance with the present invention, I have recognized that the above problems of interconnecting portable computing and communications devices with other, typically fixed devices—a process often referred to as "docking"—are solved via the use of a capacitive data connector. Such a connector includes at least one coupling plate in each of its two mating sections, so that when the two sections are brought into contact, the coupling plates form a capacitor across which data signals can be passed. In preferred embodiments, circuitry driving each section of the data connector is such as to create a bidirectional signaling path, thereby providing a connection which is functionally equivalent to an ohmic (e.g., pin-and-socket) connection. That circuitry, moreover, is preferably designed to operate based on the detection of signal transitions, rather than on the detection of signal levels. This advantageously obviates the need to provide a fixed duty cycle in the data stream (i.e., equal numbers of "1"s and "0"s over even relatively short periods of time), that such a capacitive connector would otherwise require.

A connector embodying the principles of the invention can be designed so as to support a bit rate of at least 10 Mb/s. In typical applications, this is sufficient bandwidth to allow for the serialization of data that would otherwise typically be transmitted in parallel bit streams on separate ohmic leads. Advantageously then, a single connector, providing a single signaling path, can be used to replace the multiplicity of ohmic connections of a multiplicity of connectors (e.g., the so-called serial interface, parallel interface, etc.). The actual making of the connections is thereby simplified and manufacturing costs are reduced.

In preferred embodiments, each section of the connector includes a permanent magnet to draw and hold the two sections in alignment, thereby providing a connector which is self-aligning.

A further advantage of the invention is the fact that the section of the connector that is attached to the portable device can be fully embedded within in the shell, or housing, thereof. This allows for a completely sealed design of the portable device, thereby virtually eliminating the aforementioned problems of contamination and physical trauma. Moreover, such a shell design is much stronger than a shell whose surface is interrupted by holes for connectors, screws, etc. Portable devices, by their very nature, are prone to being dropped or otherwise abused physically, and the improved strength of the shell made possible by the present invention is thus of great advantage for such devices.

A further advantage is that connectors embodying the principles of the invention will operate satisfactorily and effectively even in the face of slight mismatches in alignment between the two sections of the connector. This characteristic makes it easier for a user to effectuate a connection. This characteristic is also advantageous from a manufacturing standpoint in that manufacturing tolerances can be relatively generous compared to the manufacture of, for example, pin-based connectors.

DETAILED DESCRIPTION

Figure 1:
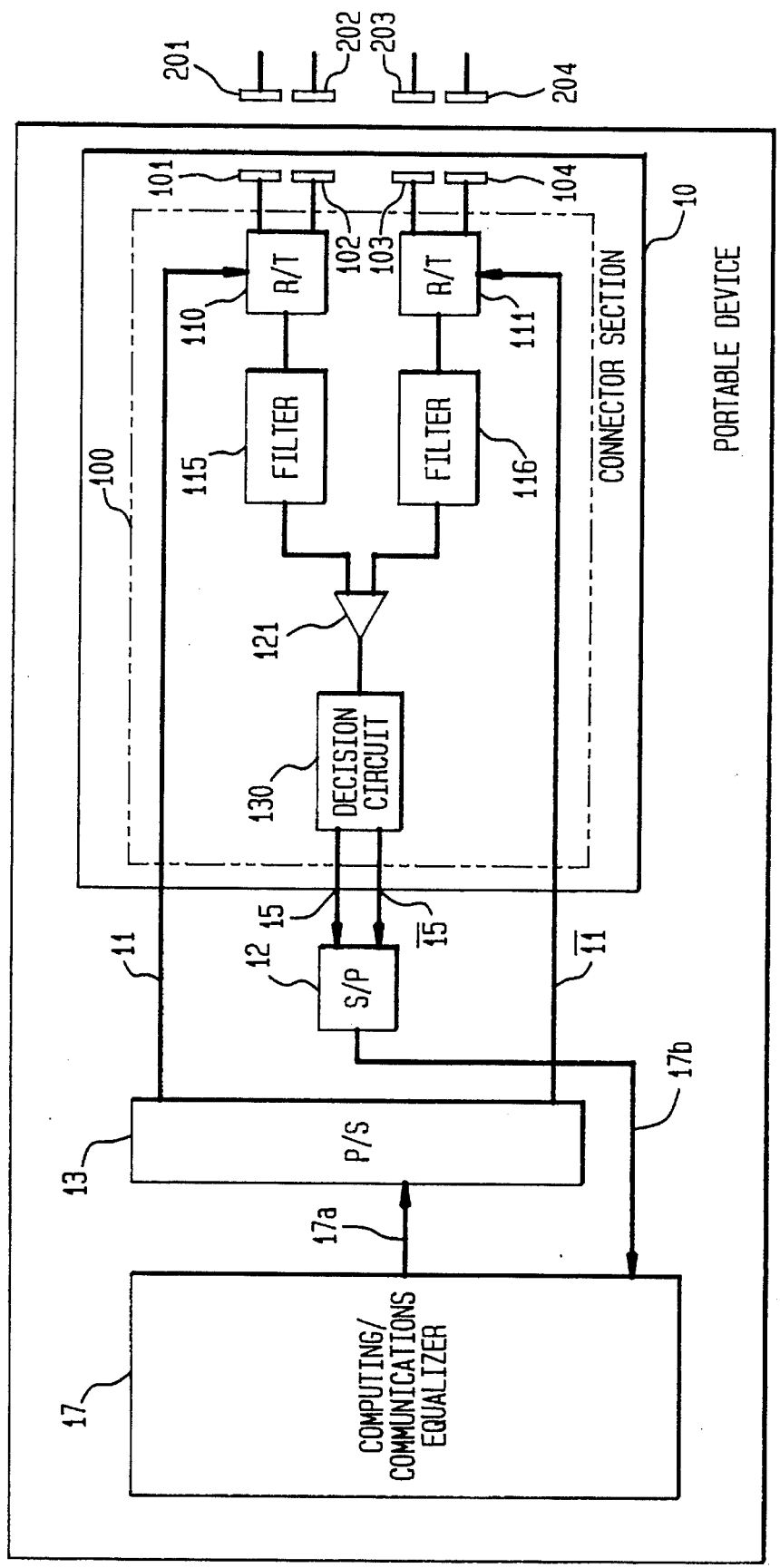
FIGS. 1 and 2 when arranged with FIG. 1 to the left of FIG. 2, comprise a schematic block diagram of a connector embodying the principles of the present invention, each section of the connector including coupling plates and a capacitive transceiver chip.
Figure 2:
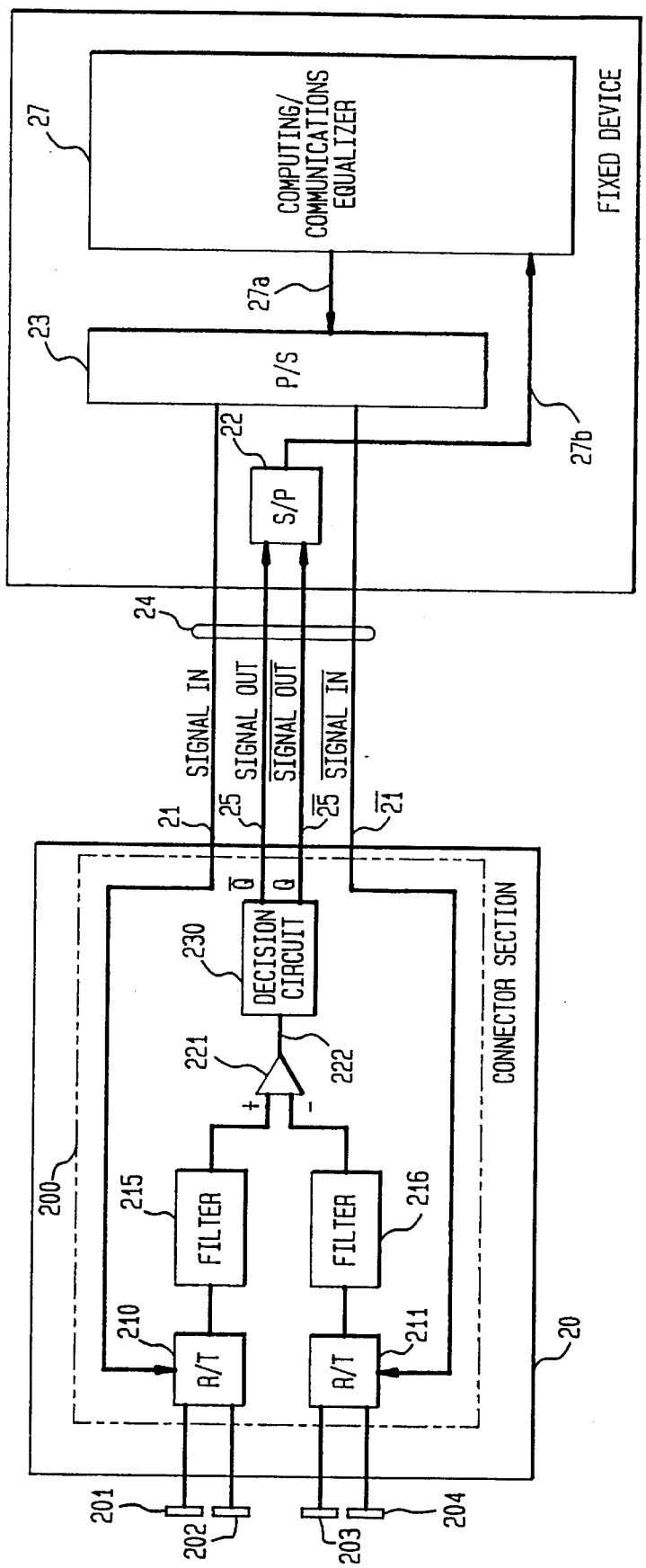

FIGS. 1 and 2 shows a portable device PD, such as a laptop computer, personal digital assistant or deliveryman's hand-held terminal, connected to a fixed device FD via connector sections 10 and 20. The latter, together, comprise a connector embodying the principles of the invention. Connector section 10 is mounted within the shell, or housing, of portable-device PD. Connector section 20 is contained within a plug housing, which is connected to fixed device FD via a cable. Fixed device FD may be, for example, a personal computer, a public telephone station or a docking station mounted in a delivery vehicle.

Portable device PD further includes computing/communications equipment 17, which represents all of the circuitry and equipment within the device except for a) connector section 10, b) serial-to-parallel (S/P) converter 12, and c) parallel-to-serial (P/S) converter 13, all of which are described in further detail below. Similarly, fixed device FD includes computing/communications equipment 27, which represents all of the circuitry and equipment within the device except for a) connector section 20, b) serial-to-parallel (S/P) converter 22, and c) parallel-to-serial (P/S) converter 23.

Connector section 10 includes a capacitive transceiver chip 100 and associated coupling plates 101, 102, 103 and 104. Similarly, connector section 20 includes a capacitive transceiver chip 200 and associated coupling plates 201, 202, 203 and 204. Connector sections 10 and 20 are electrically identical. In use, the two connector sections are brought into physical contact within one another, thereby aligning coupling plates 101 through 104 with coupling plates 201 through 204, respectively, as shown in the drawing. This arrangement provides a set of four capacitors whose coupling plates are separated by the (non-conductive) material of the housing of portable device PD and of the (non-conductive) housing of connector section 20. In accordance with the invention, it is via these capacitors that fully bidirectional signaling between portable device PD and fixed device FD is provided.

Capacitive transceiver chip 100 includes identical receiver/transmitter (R/T) circuits 110 and 111, identical matched edge detection filters 115 and 116, difference amplifier 121 and decision circuit 130. Capacitive transceiver chip 200 is identical to capacitive transceiver chip 100 and includes identical receiver/transmitter (R/T) circuits 210 and 211, identical matched edge detection filters 215 and 216, difference amplifier 221 and decision circuit 230.

R/T circuits 110 and 111 (210 and 211) receive on lead pair 11/$\overline{11}$ (21/$\overline{21}$) differential logic level signals that originate from equipment 17 (27). Those signals may represent a single information bit stream. However, the practically achievable bandwidth between the connector sections is at least on the order of 10 Mb/s. Advantageously, this is sufficient bandwidth to allow for the serialization of data in many applications that would otherwise typically be transmitted in parallel bit streams on separate ohmic connector pins. To this end, all outgoing bit streams, that are initially generated by equipment 17 (27) on separate, parallel leads—represented collectively as cable 17a (27a)—are converted to a single, differential serial stream on lead pair 11/$\overline{11}$ (21/$\overline{21}$) by P/S converter 13 (23). Similarly, all incoming bit streams, that would otherwise have been supplied to portable device PD (fixed device FD) from fixed device FD (portable device PD) on separate, parallel leads, are received from connector section 10 (20) on lead pair 15/$\overline{15}$ (25/$\overline{25}$) in the form of a single differential serial stream from connector section 10 (20) that stream being by S/P converter 12 (22) into different bit streams on individual parallel leads-represented collectively as cable 17b (27b).

Consider, now, in particular, the transmission of data signals from portable device PD to fixed device FD. R/T circuit 110 (111) responds to the data signals on leads 11/$\overline{11}$ by applying differential signals to coupling plates 101 and 102 (103 and 104), thereby causing displacement currents to flow to coupling plates 201 and 202 (203 and 204) within connector section 20. These displacement currents are sensed by R/T circuit 210 (211) and applied to filter 215 (216). Filters 215 and 216 are matched edge detection filters and they include amplifiers, thereby providing an amplified signal with enhanced edge transition signal-to-noise ratio. The outputs of filters 215 and 216 are applied to difference amplifier 221, which combines its differential inputs into a single-ended signal on lead 222 in which any common-mode signals are suppressed.

Decision circuit 230 is designed to extract the edge transitions from the difference amplifier 221 output signal in order to regenerate the data represented by the differential signal on lead pair 11/$\overline{11}$. Circuit 230, in turn, provides as its own output signal a differential signal on lead pair 25/$\overline{25}$ whose constituent bit streams are provided by S/P converter 22 to equipment 27 on respective leads of cable 27b.

Inasmuch as connector sections 10 and 20 are completely identical, the transmission of data signals from fixed device FD to portable device PD is in a manner completely analogous to that described above, And, advantageously, it will be noted the signaling at the interface between the two connector sections is bidirectional over a single differential signaling path in that the same two capacitive circuits—the one circuit including the capacitors formed by coupling plate pairs 101/201 and 102/202 and the other circuit including the capacitors formed by coupling plate pairs 103/203 and 104/204—are used for both directions of transmission.

Figure 8:
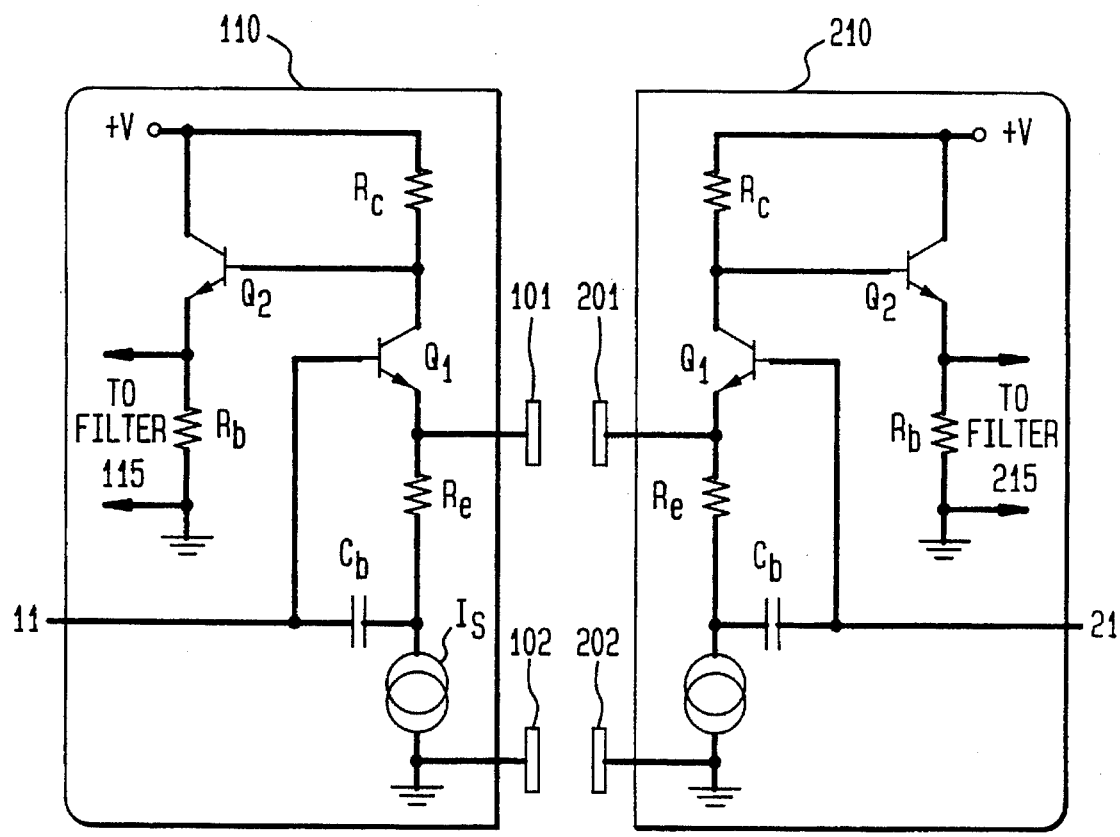
FIG. 8 is a schematic circuit diagram of two of the receiver/transmitter circuits included within capacitive transceiver chips.

The preferred design of the R/T circuits which allows for such bidirectional signaling is shown in FIG. 8.

In particular, the signals on lead 11 are applied to the base of transistor Q1 of circuit 110 serving, for the purposes of transmission to R/T circuit 210, as an emitter follower driver. Those signals appear at the emitter of transistor Q1 of circuit 110, thereby causing corresponding displacement currents to flow from coupling plate 101 to coupling plate 201 and to return via coupling plates 202 and 102. Current source $I_s$ of circuit 110 provides bias current for transistor Q1. The combination of capacitor $C_b$ and $R_e$ of circuit 110 forms a bootstrap circuit which ensures that the currents that flow out of the collector of transistor Q1 of circuit 110 are limited to being equal to the displacement currents that flow through coupling plates 101 and 102 when signals are applied to lead 11.

The displacement currents flowing between coupling plates 101 and 201 flow into the emitter of transistor Q1 of circuit 210. Assuming that the signal appearing on lead 21 is static at this time, transistor Q2 of circuit 210 functions as a common-base amplifier. As a result, the displacement currents flowing between coupling plates 101 and 201 are caused to flow out the collector of transistor Q1 of circuit 210 and into resistor $R_c$ thereof. The voltage across that resistor drives transistor Q2 of circuit 210, acting as an emitter follower buffer amplifier. The resulting signal across resistor $R_b$ of circuit 210 is applied to filter 215. Since the signaling between connector sections 10 and 20 is via capacitive paths, the signal across resistor $R_b$ of circuit 210 is in the form of a differentiated version of the signal on lead 11. Assuming, then, the the signal on lead 11 is in the form of a positive rectangular pulse, the signal across resistor $R_b$ is in the form of two voltage impulses—a positive impulse generated in response to the leading edge transition of the pulse and a negative impulse in response to the trailing edge transition. As noted earlier, the displacement currents are returned from circuit 210 back to circuit 110 via coupling plates 202 and 102.

Since all four of R/T circuits 110, 111, 210 and 211 are identical to one another, then a) the signals on lead $\overline{11}$, the logical inverse of the signals on lead 11, are transmitted to filter 216 in a manner analogous to that described above for lead 11, and b) the differential signals on lead pair 21/$\overline{21}$ are transmitted to filters 115 and 116, respectively, in a manner analogous to that in which the differential signals on leads 11/$\overline{11}$ are transmitted to filters 215 and 216, respectively.

It may also be noted, as an incidental matter, that signals applied to, for example, lead 11 cause identical signals to appear across resistor $R_b$ of circuit 110, thereby applying to filter 115 the same signal that is applied to filter 215 as described above. This effect, however, only occurs when coupling plate pairs 101/201 and 102/202 are aligned, i.e., the two connector sections are mated. Advantageously, then, the coincident appearance of a signal on lead 11 and across resistor $R_b$ of circuit 110 can be used as a diagnostic or control indication within portable device PD that connector sections 10 and 20 are, indeed, mated.

Figure 3:
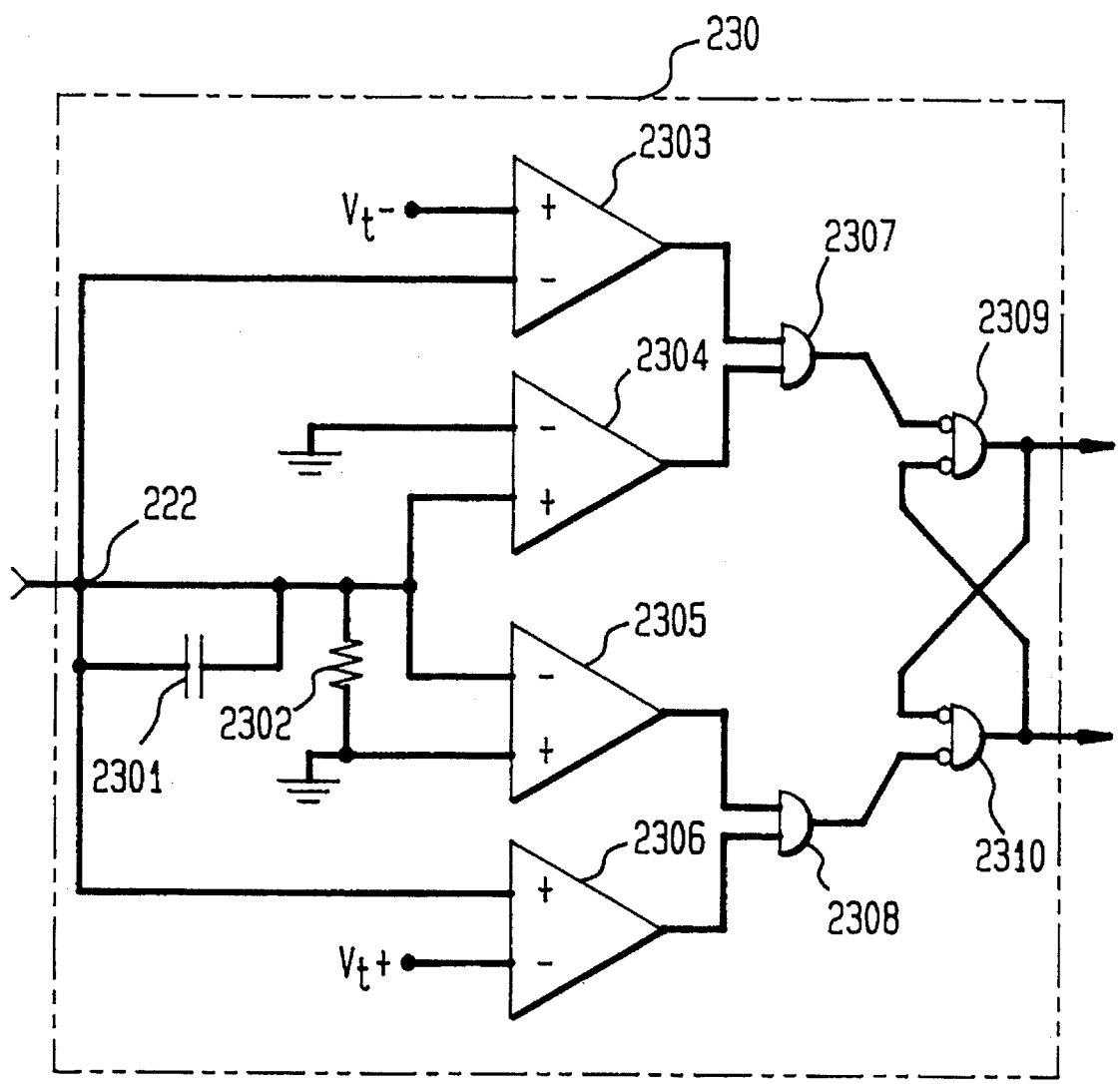
FIG. 3 is a schematic block diagram of the decision circuit included in each of the connector sections.
Figure 4:
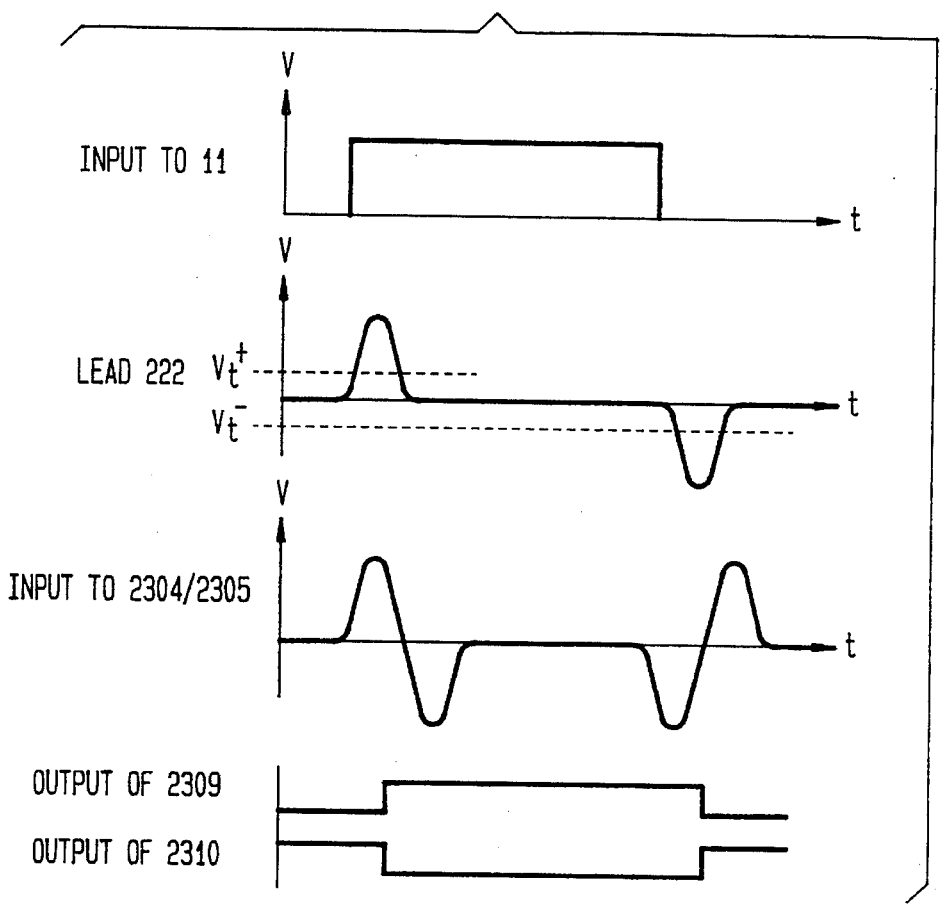
FIG. 4 shows waveforms helpful in explaining the operation of the connector of FIG. 1.

FIG. 3 shows the preferred design of detection circuit 230 (detection circuit 130 being identical thereto). In explaining the design of detection circuit 230, it should first be noted that the circuitry of capacitive transceiver chip 200, up through the output of difference amplifier 221 is designed in such a way as to realize a matched filter for detection of the transitions of signals transmitted from connector section 10. (See, for examle, "Communication Systems", A. B. Carlson, McGraw Hill, 1975, p. 156–158, for a description of matched filters). Signals representing those transitions appear at the input of decision circuit 230 on lead 222, as shown in FIG. 4, and are applied within circuit 230 to discriminator circuits 2303 and 2306. Discriminator circuits 2303 and 2306 act as window discriminators, with discriminator circuit 2303 (2306) providing a positive output when the signal on lead 222 has a negative (positive) value whose absolute value exceeds a decision threshold $V_t$. The output pulses appearing at the output of discriminator circuits 2303 and 2306 indicate detection of edge signals. They also serve as gating, or enabling signals for the edge timing circuits, as explained more fully hereinbelow. Each is applied to a respective first input of AND gates 2307 and 2308.

A matched filter for detection of the timing of the transitions is realized by differentiating the signal on lead 222. Thus, as seen in FIG. 3, that signal is differentiated by a differentiator circuit comprising capacitor 2301 and resistor 2302. The differentiated signal is applied in parallel to discriminators 2304 and 2305 which advantageously act as zero-crossing detectors. In particular, discriminator 2304 (2305) changes its output to a positive logic level when its input crosses zero in the positive (negative) direction, thereby signaling the occurrence of transitions in the transmitted signal. Other zero crossings due, for example, to noise, will also appear and cause discriminators 2304 and 2305 to change states. However, the outputs of discriminators 2303 and 2306 define windows during which a zero crossing necessarily represents a true data transition. Thus by using the outputs of those discriminators as enabling inputs for AND gates 2307 and 2308 as noted above, while applying the outputs of discriminators 2304 and 2305 to the second inputs of the AND gates, the outputs of the latter are guaranteed to optimally replicate the timing, i.e., the occurrence of transitions and sense, of the transmitted data. The data itself is reconstructed by using the outputs of AND gates 2307 and 2308 to control the state of a set/reset flip-flop comprising gates 2309 and 2310.

In alternative embodiments of the invention, coupling plates 102 and 104 (202 and 204) of FIG. 1 (FIG. 2) could be combined into a single plate having an area equal to the sum of the areas of those coupling plates. That single plate would be connected to both circuits 110 and 111 (210 and 211), thereby providing a common return path into connector section 10 (20). Moreover, the coupling plates, instead of being rectangular, can be any desired shape.

Figure 5:
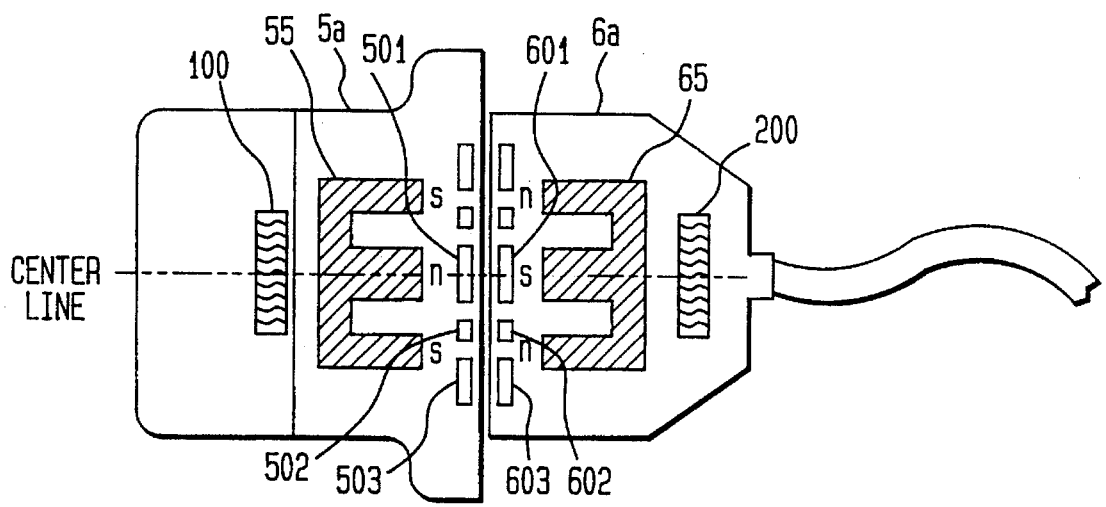
FIG. 5 is a conceptual block diagram of a connector embodying the principles of the invention, the connector being electrically identical to the connector of FIG. 1 but having a somewhat different physical structure.

These points are illustrated in FIG. 5, which is a high-level pictorial representation, in section, of a particular physical realization of connector sections 50 and 60 embodying the principles of the invention. Connector sections are electrically identical to connector sections 10 and 20 of FIGS. 1 and 2. However, in FIG. 5, in particular, one of the coupling plates of connector 50 (60) is a circular disc 501 (601) and the other two are surrounding rings 502 and 503 (602 and 603) of suitable area. Specifically, ring 503 (603) serves the same function as plates 102 and 104 (202 and 204) in the embodiment of FIGS. 1 and 2 and thus has an area twice that of disc 501 (601) and that of ring 502 (602). The disc and rings of each connector section are concentric. For drawing simplicity, connections between capacitive transceiver chips 100 and 200 and the various coupling plates are not shown.

In furtherance of the above-described goal of having a rugged, sealed design on both sides of the connection, it is desirable to be able to align the connector sections and to maintain them in intimate contact without requiring screws/screw holes, clips or other mechanical fasteners. To this end, connector sections 50 and 60 have embedded within them permanent magnets 55 and 65 whose poles and geometry are such that the two connector sections are held tight to one another with the coupling plates in alignment. Indeed, the geometry of the magnets is such as to make the connector sections self-aligning. That is, if the coupling plates are not precisely aligned when first brought together, the attraction of opposite poles will be such as to precisely align them.

Figure 6:
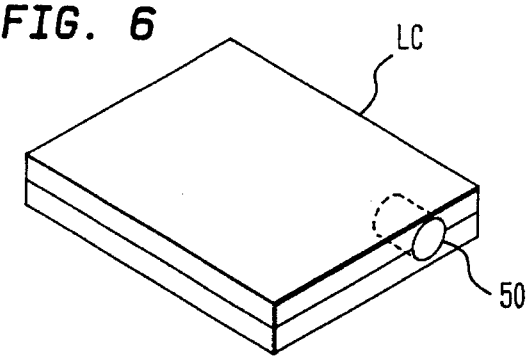
FIG. 6 is a perspective view of a portable device which includes one of the sections of the connector.
Figure 7:
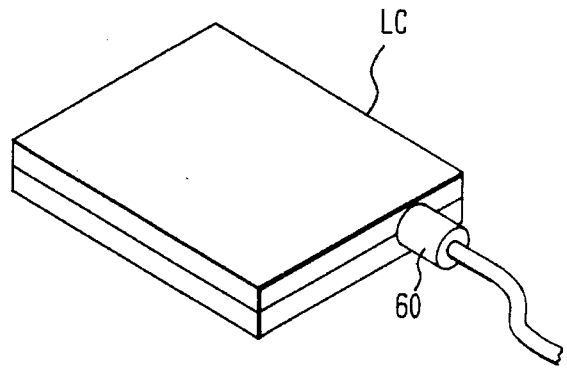
FIG. 7 is the same perspective view shown in FIG. 6, but with the other section of the connector mated to the portable device.

FIG. 6 shows a laptop computer LC having connector section 50 embedded within it. FIG. 7 shows the same laptop computer with connector section 60 mated to it.

The foregoing merely illustrates the principles of the present invention. For example, the circuitry shown in the present illustrative embodiment does not depend on a fixed duty cycle in the data stream (i.e., equal numbers of "1"s and "0"s over a relatively short period of time) in order for it to operate properly. This is a consequence of the use of signal transition, rather than signal level, detection. Advantageously, then, the disclosed circuitry can be used with any duty cycle. Moreover, it has an advantage in terms of power consumption in that it obviates the need to transmit "dummy" data that would otherwise be required in order to ensure that the fixed duty cycle criterion is constantly being satisfied.

On the other hand, if the invention is used in applications in which the duty cycle is, a priori, fixed by system constraint, a somewhat simpler circuit realization for the capacitive transceiver chip can be used.

Other variations are possible. For example, it may be desired to provide more than one independent bi-directional signaling path or to use single-ended, as opposed to differential, signaling. Moreover, although in the illustrative embodiment the return path for each end of the differential signals is a capacitive path through the connector, the return path could, alternatively, be external to the connector if in a particular application a separate mechanism for connecting the portable and fixed devices to a common ground is provided. The connector sections embodying the principles of the invention could thus include various numbers of coupling plates, depending on whether a) differential signaling is used, b) a separate return path external to the connector is provided, c) a single capacitive return path for both ends of the differential signals is provided (as in FIG. 5), rather than two separate return paths (as in FIGS. 1 and 2), d) more than one independent signaling path is desired.

It will thus be appreciated that those skilled in the art will be able to devise numerous arrangements which, although not explicitly shown or described herein, embody the principles of the invention and are within their spirit and scope.

I claim:

1. A first connector section adapted to be mated to a second connector section, said first and second connector sections together comprising a connector for a computing or communications device, said first connector section comprising a first coupling plate which, when said first and second connector sections are mated, forms a first capacitor with a corresponding first coupling plate in said second connector section, and circuitry for applying outgoing signals to said first coupling plate in such a way that said outgoing signals are coupled through said first capacitor to said second connector section, circuitry for detecting incoming signals received at said first coupling plate in response to signals coupled through said first capacitor from said second connector section, said detecting circuitry including means for filtering said received incoming signals with a signal-transition-detection matched filter, means responsive to the level of said filtered signals for generating time window signals, means for differentiating said filtered signals, and means for replicating said signals coupled from said second connector section as a function of zero-crossings of said differentiated signals which occur during said time window signals, and said device including a housing, and the entirety of said first connector section being contained wholly within said device housing.

2. The first connector section of claim 1 wherein said first connector section includes a magnet which attracts a corresponding magnet in said second connector section when said first and second connector sections are mated.

3. The first connector section of claim 1 wherein said first connector section includes a second coupling plate which forms a second capacitor with a corresponding second coupling plate in said second connector section when said first and second connector sections are mated, and wherein said first connector section includes a return path for said outgoing and incoming signals which includes said second coupling plate of said first connector section.

4. The first connector section of claim 3 wherein each of said first and second coupling plates in said first connector section are geometrically concentric with one another.

5. The first connector section of claim 3 wherein one of said first and second coupling plates in said first connector section is a ring which surrounds the other of them.

6. The first connector section of claim 1 wherein said applying circuitry and said detecting circuitry share in a common receiver/transmitter circuit, said receiver/transmitter circuit including a first transistor whose emitter is coupled to said first coupling plate, means for applying said outgoing signals to the base of said transistor, and means for biasing said first transistor so that it operates as an emitter-follower driver for said outgoing signals and as a common-base receiver for said incoming signals.

7. The first connector section of claim 6 wherein said first connector section includes a magnet which attracts a corresponding magnet in said second connector section when said first and second connector sections are mated.

8. The first connector section of claim 1 further comprising a second coupling plate which, when said first and second connector sections are mated, forms a second capacitor with a corresponding second coupling plate in said second connector section, and circuitry for applying a differential image of said outgoing signals to said second coupling plate in such a way that said differential image is coupled through said second capacitor to said second connector section.

9. A connector comprising a pair of connector sections adapted to be mated to each other, each connector section of the pair comprising a first coupling plate which, when said pair of connector sections are mated, forms a first capacitor with the corresponding first coupling plate in the other connector section, circuitry for applying outgoing signals to said first coupling plate in such a way that said outgoing signals are coupled through said first capacitor to said other connector section and for detecting incoming signals received at said first coupling plate in response to signals coupled through said first capacitor from said other connector section, and said detecting circuitry including means for filtering said received incoming signals with a signal-transition-detection matched filter, means responsive to the level of the filtered signals for generating time window signals, means for differentiating said filtered signals, and means for replicating said signals coupled from said other connector section as a function of zero-crossings of said differentiated signals which occur during said time window signals.

10. The invention of claim 9 wherein said each connector section includes a magnet which attracts a corresponding magnet in said other connector section when said pair of connector sections are mated.

11. The invention of claim 9 wherein said each connector section includes a second coupling plate which forms a second capacitor with a corresponding second coupling plate in said other connector section when said pair of connector sections are mated, and wherein said each connector section includes a return path for said outgoing and incoming signals which includes said other coupling plate of said each connector section.

12. A connector comprising a pair of connector sections adapted to be mated to each other, each connector section of the pair comprising first, second and third coupling plates which, when said pair of connector sections are mated, form first, second and third capacitors with the corresponding first, second and third coupling plates in the other connector section, and circuitry for applying differential outgoing signals to said first and third coupling plates in such a way that the respective differential portions of said outgoing signals are coupled through said first and third capacitors to said other connector section and for detecting differential incoming signals received at said first and third coupling plates in response to differential signals coupled through said first and third capacitors from said other connector section, circuitry in said each connector section which includes means responsive to the differential portions of the received incoming signals for forming signals representing the difference between them, and means for filtering said difference signals with a signal-transition-detection matched filter, means responsive to the level of said filtered difference signals for generating time window signals, means for differentiating said filtered difference signals, and means for replicating said signals coupled from said other connector section as a function of zero-crossings of said filtered differentiated signals which occur during said time window signals.

13. The invention of claim 12 which further comprises circuitry which provides a return path for said differential outgoing and differential incoming signals via at least said second capacitor.

* * * * *